United States Patent Office 3,350,243
Patented Oct. 31, 1967

3,350,243
METHOD OF AND COMPOSITION FOR CONTROLLING SCALE FORMATION ON FERRIFEROUS SURFACES
Louis Schiffman, Wyncote, Pa., assignor to Amchem Products, Inc., Ambler, Pa., a corporation of Delaware
No Drawing. Filed Oct. 11, 1965, Ser. No. 494,864
8 Claims. (Cl. 148—18)

ABSTRACT OF THE DISCLOSURE

An aqueous composition containing bentonite clay, a metal additive of copper, aluminum or iron, and optionally a wetting agent is applied to a ferriferous surface for the purpose of controlling scale formation on the surface when it is heat treated. The improved performance obtained by adding boric acid to the above described aqueous composition is also described.

---

This application is a continuation-in-part of my copending U.S. patent application, Ser. No. 437,301, entitled, "Method of and Composition for Controlling Scale Formation on Ferriferous Surfaces," filed Mar. 4, 1965, now abandoned, and assigned to the same assignee as this application.

The present invention relates to the art of metal treatment and is especially concerned with the treatment of ferriferous metal in such a manner as to control scale formation during heat treating operations.

It should be understood that the term "ferriferous" as used herein includes a wide variety of steels, iron, and iron alloys, including alloys of iron with chromium and/or nickel, the latter family of alloys sometimes being known as "stainless steel." The term ferriferous is also used to include steel and iron and iron alloys which may contain protective coatings on the surface thereof, such as zinc phosphate coatings which may have been applied to the surface for various reasons prior to the stage of metal working and processing where this invention is particularly useful.

As is well known to those skilled in this art, heat treatment of ferriferous metal, and particularly of steel, results in the formation of scale on the surface which, for most purposes, must be removed before the metal can be used in industry. This scale is difficult to remove and it is common to resort to extended pickling cycles or various mechanical operations such, for example, as sand blasting, in order to remove the deposit.

As will be pointed out more fully below, weight loss as a result of heat treatment and subsequent scale removal for a given part can reach proportions which are a significant fraction of the original weight of the part. In fact, in one of the control samples in the tests described below the weight loss was over 22%, while in others it was as high as 7%. From this it can be seen that scale formation is not only inconvenient because the scale must be removed, but also that scale formation can be a significant item of manufacturing waste, and can render unsuitable a program or cycle of heat treatment which is otherwise desirable for obtaining good properties in the metal.

Among the efforts which have been made to overcome this problem may be mentioned certain chemical treatments which have been designed for the purpose of altering the scale which is formed during the heat treating procedure in order to permit easy removal thereof during subsequent treating steps such, for example, as acid pickling. Typical of this approach has been the use of metal halides which modify the scale thereby permitting faster removal thereof than would be possible otherwise. However, such practices are not suitable for many situations due to the fact that they result in the formation of very heavy scale deposits and therefore involve a large loss of metal when the scale is removed. Beyond this, the use of halides produces highly objectionable corrosive atmospheres in the heat treating furnaces.

Other efforts to control scale formation have involved the use of barriers of one kind or another to minimize air contact with the metal during the heat treating operation. However, the fruits of work along this line have not been fully realized because the technique does not seem to be commercially acceptable. A typical example of the practice is disclosed in United States Patent No. 2,900,272 which describes a process utilizing an admixture of an organic derivative of clay plus an organic binder dissolved in an organic solvent. However, such a process, being based on the utilization of an organic system, suffers from the hazards normally associated with the use of toxic and/or inflammable solvents. Moreover, it is relatively costly because of the fact that the special clay which is required must be derived from the reaction thereof with organic bases.

Still other attempts to control scale formation during heat treatment have involved utilization of inert gas atmospheres and while these result in substantial reductions in scale formation they necessitate appreciable expenditures for the specialized equipment which is required to carry out the technique and for this reason have not been widely accepted.

With the foregoing factors in mind it can be stated that the principal objects of my invention reside in the provision of a process for controlling scale formation during heat treating operations which will minimize metal loss during subsequent removal of the scale; the provision of an economically feasible process for modifying the character of the scale which is formed, which process is based upon the employment of inexpensive and readily available raw materials; and the provision of a halide-free process for modifying scale formation during heat treating operations whereby the scale may be more readily removed in shorter periods of time than has theretofore been possible, thereby appreciably extending the life of pickling baths.

More specific objects include the provision of a process, and material for use in the process, for controlling scale formation during heat treating operations for a wide variety of ferriferous materials, including particularly alloys of iron and chromium and/or nickel and surfaces which may have received coatings of other materials in earlier processing. Another specific advantage is the reduction of pickling times for scale removal which reduction can materially speed up the processing time for a given piece being treated.

How the foregoing objects and advantages together with such others as may appear hereinafter are attained will now be described in detail.

To begin with, the present invention is based upon the discovery that scale formation during heat treatment of ferriferous metals can be materially modified and greatly reduced in amount and rendered more readily removable by subsequent physical or chemical means if the surface to be heat treated is first covered with an aqueous slurry or paste consisting of (1) at least 5% by weight of a bentonite clay and (2) from 0.01 to 0.2 part by weight thereof for each part by weight of bentonite, of an additive selected from the group consisting of metallic copper, aluminum, iron and the hydroxides, oxides, carbonates and phosphates thereof and then heat treated at temperatures ranging from 800° to 2200° F.

Bentonite clays have unique characteristics and they contain major amounts of the mineral montmorillonite the approximate chemical formula of which mineral is accepted as being the following:

$$(Al, Fe_{0.67}Mg_{0.33})Si_4O_{10}(OH)_2Na, Ca_{0.33}$$

While the chemical and physical properties of bentonite clays are well known in the chemical industry, enlightened discussions of these properties, and of such clays in general, may be found in Clay Mineralogy, by Grim; McGraw-Hill Book Company, Inc. (1953) and in Chemistry and Physics of Clays, by Searle, third edition; Interscience Publishers, Inc. (1959).

The amount of bentonite clay which is utilized in the process of the present invention must be at least 5% by weight of the composition which is applied to the surface. Where less than 5% is employed the protective film will be too thin and not sufficiently rich in bentonite clay to yield the required substantial protection for the underlying metal surface.

Insofar as an upper limit of concentration is concerned it has been discovered that this is limited solely by practical considerations of economy and ease of handling. In other words, large amounts do no harm but as the concentration of the bentonite clay is increased the aqueous slurry produced rapidly increases in viscosity until finally a paste is obtained. While paste formulations can be employed they present certain practical difficulties such as that which is involved in ease of handling or in obtaining sufficient adherence to the underlying metal surface. Because of these difficulties it is preferred to limit the upper level of bentonite clay concentration to about 10% by weight based on the total composition.

Insofar as the metal additive is concerned, the amount which must be incorporated into the aqueous bentonite composition has been found to be from 0.01 to 0.2 part by weight for each part by weight of bentonite employed. Where less than 0.01 part of the additive is utilized per part of bentonite clay the results obtained will show no improvements over results which can be secured by the use of bentonite alone. On the other hand, where more than 0.2 part by weight of additive is employed per part by weight of bentonite clay the protective scale or film which is produced during subsequent heat treatment will be friable and will lack tenacity with respect to the underlying metal surface.

As indicated above, slurries are preferred as distinguished from pastes and the preferred method of applying the aqueous bentonite compositions of this invention is by utilization of a conventional dip treatment whereby the surface of the metal is thoroughly and completely contacted with the composition. However, other means may be adopted such, for example, as a spray technique or by the use of a roller coating procedure which is quite practical in the case of flat surfaces. Also, brushing procedure may be employed where that is practical.

The duration of the application treatment need be for such time only as is necessary to insure complete coating of the surface with the composition. It might also be noted that paste compositions are not as desirable as slurries due to the fact that more of the bentonite clay will very likely be used than is actually necessary for achieving the advantageous and improved results of the present invention.

It is within the purview of this invention to incorporate a small amount of a wetting agent into the aqueous bentonite slurries of this invention so as to insure complete contact of the metal surfaces with a film of the bentonite clay. The choice of wetting agent may be anionic, cationic or, preferably, nonionic in nature. Typical wetting agents of each of these types are.

Anionic type:
  Du Pont's "Alkanol" B, sodium alkyl naphthylene sulfonate
  Du Pont's "Alkanol" DW, alkyl-aryl sodium sulfonate
  Antara's "Igepon" TE-42, sodium N-methyl-N- "tallow acid" taurate
  Monsanto's "Santomerse" 1, alkyl aryl sodium sulfonate
  Atlantic's "Ultra-Wet" K, alkyl benzene sodium sulfonate
  Wyandotte's "Kreelon" 4G, alkyl-aryl sodium sulfonate Non-ionic type:
  Atlas "Brij" 35, polyoxyethylene lauryl ester
  Antara's "Emulphor" ON, a polyoxyethylated fatty alcohol
  Armour's "Ethofat" C/60, polyoxyethylene-glycol ester of coconut fatty acid; 50 mols ethylene oxide added to 1 mol of acid
  Antara's "Igepal" CA-630, nonyl phenoxy polyoxyethylene ethanol
  Wyandotte's "Pluronic" F-68, a condensate of ethylene oxide with a hydrophobic base formed by condensing propylene oxide with propylene glycol
  Atlas' "Renex" 20, polyoxyethylene ester of mixed fatty and resin acids
  Rohm and Haas' "Triton" X-100, alkyl-aryl polyether alcohol Cationic type:
  Armour's "Arquad" S,N-alkyl trimethyl ammonium chloride
  Fairfield Laboratories' "Cetab," cetyl trimethyl ammonium bromide
  Armour's "Ethomeen" C/20, tertiary amines; ethylene oxide condensation products of primary fatty amines Although it is preferred that the process of the present invention be utilized on relatively clean metal surfaces it is not necessary that the surfaces be cleaned or subjected to any other preliminary treatment because the process is suitable for use over normally encountered mill soil and/or oxidized ferrous surfaces.

Insofar as the temperatures of heat treatment which are suitable with my invention are concerned I have found that these should range from about 800° F. to about 2200° F. as above indicated because within this range the advantages and improvements incident to the present invention are best secured. Furthermore, within this range there will be a minimum loss of metal through scale formation and subsequent removal thereof. Still further, operation of the process within this temperature range results in the formation of a more easily removable scale so that subsequent pickling cycles can be substantially reduced.

If heat treating temperatures greater than 2200° F. are employed, the loss in weight of underlying metal will increase rapidly due to failure of the bentonite clay film to protect the metal with the resultant formation of heavy scale deposits. This in turn will result in greater difficulty in removal of the scale deposits with more rapid consumption of pickling acid and shorter life of pickle baths.

Between the temperatures of 800° F. and 2200° F. the ferrous metal surfaces, following heat treatment and scale removal, will be found to be smooth and more lustrous than surfaces which were heat treated without benefit of the bentonite films of this invention.

By way of illustration of the improvements which are characteristic of the present invention I wish to present the following examples of various tests which have been performed and the results which were secured thereby. These, however, are not to be construed as in any way limiting the scope of the invention except as defined in the appended claims.

In the illustrations which follow it should be noted that in each case, the test specimens were treated with pickling solutions of known type appropriate for the particular ferriferous material involved. All of the pickling solutions were inhibited, that is, they contained known additives to give them the property of dissolving scale without substantially attacking the underlying ferriferous surface. In certain of the tables of data, the pickling time is reported. In each case, the time recorded is that required to remove the scale without substantial dissolution of the underlying metal, and it can be seen that by the use of the teachings herein, significant reductions in pickling time are attained.

As shown in Table I below cold rolled steel bars were subjected to heat treating conditions following immersion in the various aqueous bentonite slurries listed in the table. The temperature of the heat treatment given to the bars was 1500° F. and the length of the heat treatment was held constant at 240 minutes.

In all of the tests reported in Table I, as well as in the tests of subsequent tables, "percent weight loss" refers to the weight lost by the test specimen following scale removal after heat treatment by use of conventional pickling baths or other mechanical operations relative to the weight of the specimen before immersion in the aqueous bentonite slurry. Furthermore, each specimen after heat treatment was removed from the oven and allowed to cool in the air to room temperature before pickling or other removal of the scale.

TABLE I

| Bentonite, Percent by Wt. | Type | Metal Additive, Part/Part Bentonite | Percent Weight Loss |
|---|---|---|---|
| None | None | | 7.27 |
| 5 | ----do---- | | 2.58 |
| 5 | Fe Powder | 0.02 | 1.27 |
| 5 [1] | ----do---- | 0.04 | 0.80 |
| 5 [1] | Fe₂O₃ | 0.04 | 1.20 |
| 5 [1] | Al Powder | 0.04 | 1.63 |
| 5 [1] | Cu Powder | 0.04 | 2.07 |

[1] In these tests the slurry had incorporated therein 0.05% by weight of a non-ionic polyethoxylated alkyl phenol. Specifically this wetting agent is the one which is listed above among the non-ionic types as: Antara's "Igepal" CA-630, nonyl phenoxy polyoxyethylene ethanol.

Prior to determining weight losses the specimens listed in Table I were first subjected to the pickling action of an inhibited solution of 10% sulfuric acid at a temperature of 150° F.

A further series of tests were conducted as reported in Table II below. The heat treatment of the specimens in Table II, however, was conducted at 1800° F. for periods of 10 minutes for each specimen. The bentonite slurry compositions employed are listed in the table and the resulting weight losses are also indicated.

TABLE II

| Bentonite, Percent by Wt. | Type | Metal Additive, Part/Part Bentonite | Percent Weight Loss |
|---|---|---|---|
| None | None | | 3.73 |
| 5 | ----do---- | | 0.81 |
| 5 | Fe₂O₃ | 0.4 | 0.49 |
| 5 | FePO₄ | 0.04 | 0.69 |
| 5 | Al₂O₃ | 0.04 | 0.48 |
| 5 | FeCO₃ | 0.04 | 0.41 |
| 5 | Cu Powder | 0.04 | 0.73 |

The specimens of Table II were subjected to the same pickling after treatment as was described above following Table I.

Additional tests were conducted employing heat treatment at 1500° F. and utilizing various amounts of powdered Fe₂O₃ and employing a heat treating cycle of 240 minutes. Cold rolled steel bars were again employed and results of these tests are summarized below in Table III.

TABLE III

| Bentonite, Percent by Wt. | Type | Metal Additive, Part/Part Bentonite | Percent Weight Loss |
|---|---|---|---|
| None | None | | 7.27 |
| 5 | Fe₂O₃ | 0.01 | 1.47 |
| 5 | Fe₂O₃ | 0.02 | 1.47 |
| 5 | Fe₂O₃ | 0.04 | 1.20 |

The treated steel bars were pickled in 10% sulfuric acid subsequent to the treatment stage and prior to determining weight losses.

Another series of tests using cold rolled steel bars as specimens was run at 1800° F. utilizing 240 minute heat treating cycles with the results indicated in Table IV below.

TABLE IV

| Bentonite, Percent by Wt. | Type | Metal Additive, Part/Part Bentonite | Percent Weight Loss |
|---|---|---|---|
| None | None | | 22.6 |
| 5 | ----do---- | | 19.9 |
| 5 | Fe Powder | 0.04 | 11.3 |

Pickling of the treated panels was conducted in 10% sulfuric acid following heat treatment and before determining weight losses.

In another series of tests hot rolled steel bars were employed as specimens utilizing 30 minute heat treating cycles at 1200° F. and the results of these tests are reported below in Table V.

TABLE V

| Bentonite, Percent by Wt. | Type | Metal Additive, Part/Part Bentonite | Percent Weight Loss |
|---|---|---|---|
| None | None | | 0.85 |
| 5 | Fe₂O₃ | 0.02 | 0.27 |
| 5 | Fe₂O₃ | 0.08 | 0.28 |
| 5 | Fe₂O₃ | 0.2 | 0.27 |
| 5 | Fe(OH)₃ | 0.14 | 0.30 |
| 10 | Fe₂O₃ | 0.06 | 0.27 |

Each of the treated metal panels was pickled in 10% sulfuric acid prior to determining the metal loss.

It has also been discovered that the performance of the aqueous compositions of bentonite and metallic or metallic compound additives discussed above is greatly improved if boric acid is incorporated into the composition as an additional additive. The use of boric acid as a component in the treating compositions improves the results in several ways. First, it tends to cut the weight loss resulting from heat treating even further than the reduction obtained by the use of bentonite and metallic or metallic compound additive. Second, it has been found that the use of boric acid reduces the pickling time, that is the time required to remove the heat treating scale in the pickling bath. Finally, the use of boric acid produces an improved appearance in the parts after the completion of the pickling. For some applications, appearance of the parts is particularly important and in such cases the use of compositions containing boric acid is quite advantageous. It should be understood that the amount of improvement in each of the above respects resulting from the use of boric acid will vary somewhat, depending on the type of ferriferous surface being treated, and also depending to some extent on the particular metallic or metallic compound additive which is used in conjunction with the bentonite and boric acid. Boric acid containing treating compounds have been found to be especially useful in the treatment of iron alloys containing chromium and/or nickel, such as the stainless steels.

The boric acid should be present in an amount equal to at least 0.1% by weight, because it has been found that the improvement in performance of the treating compositions is negligible if less is used. Boric acid concentrations in the range of 4 to 5% by weight have been found to be quite satisfactory and it can thus be said that the preferred concentration falls within this range. Lesser amounts of boric acid, above the minimum just mentioned, may be satisfactory for particular applications. The upper limit of boric acid concentration is imposed solely by considerations of economy, and its solubility at application temperatures, as well as ease of handling. Large amounts of boric acid do no harm but when the concentration is increased above five percent the improvement in result is not commensurate with the increased cost. The concentration of the other ingredients of the treating composition should follow the ranges discussed above for compositions which do not contain boric acid. Thus it is preferred that the bentonite clay concentration be at least 5% by weight and that the concentration of the other additive selected from the group consisting of metallic copper, aluminum, iron and the hydroxides, oxides, carbonates and phosphates thereof be from 0.01 to 0.2 part by weight for each part by weight of bentonite.

For reasons which are not presently understood, it has been discovered that the use of alkali salts of boron do not yield the improved results which can be obtained by the employment of boric acid.

The techniques for application of boric acid containing compositions are substantially the same as those for compositions which do not contain boric acid. Similarly, the use of a small amount of wetting agent is desirable for the three component composition. The discussion of the desirable heat treating temperature ranges given above also applies to the use of compounds incorporating boric acid.

The following tables of data report the results of tests which illustrate the improved results obtained by the use of three component treating compositions containing bentonite, metallic compound additives and boric acid. In each table, control samples are used to illustrate the improvement gained over processes in which no treating composition whatever is used. The tables also report tests comparing the performance of treating compositions containing boric acid with compositions which do not. Furthermore, some of the tables report the results from the use of bentonite clay alone as a treating composition.

The use of the compounds in this invention on ferriferous surfaces of the stainless steel type is illustrated in the Tables VI and VII.

TABLE VI

All tests were conducted at 2000° F. utilizing 30-minute treating cycles on Type 304 stainless steel.

| Treatment | Percent Weight Loss | Pickling Time after Treatment,[1] minutes |
|---|---|---|
| Control | 0.596 | 4 |
| Bentonite, 5% | 0.318 | 3 |
| Bentonite, 5% plus $Fe_2O_3$, 0.2% | 0.332 | 2.5 |
| Bentonite, 5% plus $Fe_2O_3$, 0.2% plus $H_3BO_3$, 4% | 0.0893 | 2 |

[1] Represents time required to pickle the treated stainless steel surfaces in a solution containing 10% nitric and 2% hydrofluoric acids at 110° F.

The tests in Table VII were made on Type 302 stainless steel, utilizing 90-minute treating cycles at 1900° F.

TABLE VII

| Treatment | Percent Weight Loss | Pickling Time after Treatment,[1] minutes | Appearance Following Pickling |
|---|---|---|---|
| Control | 3.16 | 15 | Spotty. |
| Bentonite, 5% plus $Fe_2O_3$, 0.2% | 2.72 | 11 | Do. |
| Bentonite, 5% plus $Fe_2O_3$, 0.2% plus $H_3BO_3$, 5% | 1.48 | 8 | Smooth. |

[1] Represents time required to pickle the treated stainless steel surfaces at 110° F. utilizing a solution containing 10% nitric and 2% hydrofluoric acids.

Tables VIII and IX illustrate the use of both two components and three component treating compositions on ferriferous surfaces which during their prior history were treated with a zinc phosphate coating solution. Thus, this data may be taken as a demonstration of the applicability of the compounds of the invention even to ferriferous surfaces which may have a chemical coating thereon. It should be noted that although both classes of treating compounds yield improved results with such surfaces, the compounds containing boric acid yield superior results.

A comparison of the results of various treatments on hot-rolled hemispherical steel surfaces which had previously been subjected to the action of a proprietary zinc phosphate coating solution and drawing lubricant and which were treated for 30-minute cycles at 1200° F. may be seen below in Table VIII.

TABLE VIII

| Treatment | Percent Weight Loss | Pickling Time, minutes [1] | Appearance Following Pickling |
|---|---|---|---|
| Control | 0.491 | 10 | Spotty. |
| Bentonite, 5% | 0.301 | 25 | Do. |
| Bentonite, 5% plus $Fe_2O_3$, 0.2% | 0.282 | 20 | Spotty-smooth. |
| Bentonite, 5% plus $Fe_2O_3$, 0.2% plus $H_3BO_3$, 4% | 0.236 | 10 | Smooth. |

[1] Pickling was conducted in inhibited 10% sulfuric acid solution.

Cold-rolled cylindrical steel articles which had been subjected to the coating action of a proprietary zinc phosphate solution and which contained a drawing lubricant were heat treated at 1200° F. utilizing a treating cycle of 30 minutes, following treatment by several compositions for purposes of comparison. These results are shown below in Table IX.

TABLE IX

| Treatment | Percent Weight Loss | Pickling Time,[1] Min. |
|---|---|---|
| Control | 0.851 | 4 |
| Bentonite, 5% plus $Fe_2O_3$, 0.2% | 0.614 | 10 |
| Bentonite, 5% plus $Fe_2O_3$, 0.2% plus $H_3BO_3$, 4% | 0.460 | 4 |

[1] Pickling was conducted in inhibited 10% sulfuric acid.

Metal articles treated with the composition including boric acid, as shown above in Table IX, were very smooth in appearance following pickling as compared with articles treated with the composition containing only bentonite and the ferric oxide additive.

The effect of temperature variations in the heat treatment of cold-rolled steel articles which have been subjected to the action of a composition containing 5% Bentonite plus 0.2% $Fe_2O_3$, plus 4% $H_3BO_3$ may be seen from the following table. Temperatures were varied from 1200° F. to 1800° F., utilizing 30 minute treating cycles.

TABLE X

| Treatment | Percent Weight Loss | Temp., °F. | Pickling Time,[1] Min. |
|---|---|---|---|
| Control | 0.156 | 1,200 | 3.5 |
| Bentonite, 5% plus 0.2% $Fe_2O_3$ plus 4% $H_3BO_3$ | 0.048 | 1,200 | 3.5 |
| Control | 2.18 | 1,600 | 27.0 |
| Bentonite, 5% plus 0.2% $Fe_2O_3$ plus 4% $H_3BO_3$ | 0.625 | 1,600 | 22.5 |
| Control | 6.26 | 1,800 | 92.0 |
| Bentonite, 5% plus 0.2% $Fe_2O_3$ plus 4% $H_3BO_3$ | 2.92 | 1,800 | 73.5 |

[1] Pickling was conducted in inhibited 10% sulfuric acid.

The data presented in Table XI demonstrates the improved results obtained when boric acid is used in conjunction with bentonite and a variety of the metallic or metallic compound additives. Improvements similar to those recorded in Table XI result from the incorporation of boric acid in treating compositions containing any of the class of additives selected from the group consisting metallics copper, aluminum, and iron and hydroxides, oxdies, carbonates, and phosphate thereof. It should be noted that in some cases, such as the example where the additive is ferric carbonate, the improvement in metal loss gained by the use of boric acid is relatively slight, but that even in such cases, a material reduction pickling time is obtained.

The treatments reported in Table XI were conducted on cold-rolled carbon steel which was heat treated at 1350° F. for one-half hour and pickled after heat treatment in 10% inhibited sulfuric acid at 150° F.

TABLE XI

| Treatment | Percent Metal Wt. Loss | Pickling Time, min. |
|---|---|---|
| Control | 0.67 | 12 |
| Bentonite 5%, plus Fe powder 0.2% | 0.16 | 15 |
| Bentonite 5%, plus Fe powder 0.2%, $H_3BO_3$ 4% | 0.11 | 6 |
| Bentonite 5%, plus $Fe_2O_3$ 0.2% | 0.12 | 12 |
| Bentonite 5%, $Fe_2O_3$ 0.2%, $H_3BO_3$ 4% | 0.09 | 2 |
| Bentonite 5%, $FeCO_3$ 0.2% | 0.10 | 10 |
| Bentonite 5%, $FeCO_3$ 0.2%, $H_3BO_3$ 4% | 0.09 | 7 |
| Bentonite 5%, Al powder 0.2% | 0.32 | 12 |
| Bentonite 5%, Al powder 0.2%, $H_3BO_3$ 4% | 0.20 | 2 |

I claim:

1. The method of treating ferriferous surfaces which comprises controlling scale formation on the ferriferous surface by applying to the surface an aqueous slurry composition consisting essentially of: (1) at least 5% and ranging up to not more than about 10% by weight of bentonite clay, (2) from 0.01 to 0.2 part by weight for each part of bentonite of an additive selected from the group consisting of metallic copper, aluminum and iron and the hydroxides, oxides, carbonates and phosphates thereof, and (3) water in an amount sufficient to render the composition a slurry; heat treating the surface at a temperature from 800° F. to 2200° F.; and removing scale from the heat treated surface.

2. The method of claim 1 wherein the aqueous slurry composition contains boric acid in an amount ranging from at least 0.1% to 5% by weight.

3. The method of claim 1 wherein the aqueous slurry composition contains a wetting agent in an amount sufficient to ensure complete contact of the surface with the composition.

4. The method of claim 2 wherein the aqueous slurry composition includes a wetting agent in an amount sufficient to ensure complete contact of the surface with the composition.

5. An aqueous slurry composition for controlling scale formation on a ferriferous surface consisting essentially of: (1) at least 5% and ranging up to not more than about 10% by weight of bentonite clay, (2) from 0.01 to 0.2 part by weight for each part of bentonite of an additive selected from the group consisting of metallic copper, aluminum and iron and the hydroxides, oxides, carbonates and phosphates thereof, and (3) water in an amount sufficient to render the composition a slurry.

6. An aqueous slurry composition in accordance with claim 5 containing boric acid in an amount ranging from at least 0.1% to 5% by weight.

7. An aqueous slurry composition in accordance with claim 5 containing a wetting agent in an amount sufficient to ensure complete contact of the ferriferous surface with the composition.

8. An aqueous slurry composition in accordance with claim 6 containing a wetting agent in an amount sufficient to ensure complete contact of the ferriferous surface with the composition.

References Cited

UNITED STATES PATENTS

| | | | |
|---|---|---|---|
| 2,121,606 | 6/1938 | McCulloch | 148—22 |
| 3,048,495 | 8/1962 | Petkus et al. | 117—6 |
| 3,178,321 | 4/1965 | Satterfield | 148—14 X |

DAVID L. RECK, *Primary Examiner.*

HYLAND BIZOT, *Examiner.*

H. F. SAITO, *Assistant Examiner.*